United States Patent [19]

Nemer

[11] Patent Number: 5,712,878
[45] Date of Patent: Jan. 27, 1998

[54] DIGITAL FSK MODULATOR

[75] Inventor: Joseph C. Nemer, Mayfield Hts., Ohio

[73] Assignee: Elsag International N.V., Amsterdam, Netherlands

[21] Appl. No.: 699,638

[22] Filed: Aug. 19, 1996

[51] Int. Cl.⁶ .................................................. H03C 3/00

[52] U.S. Cl. ...................... 375/303; 375/272; 332/100; 332/104

[58] Field of Search .................... 332/100, 101, 332/104, 106, 128; 375/303, 272; 370/100.1; 329/307; 331/179; 455/71

[56] References Cited

U.S. PATENT DOCUMENTS 5,365,548  11/1994  Baker .................................. 375/62

*Primary Examiner*—Stephen Chin
*Assistant Examiner*—Joseph Roundtree
*Attorney, Agent, or Firm*—Michael M. Rickin

[57] ABSTRACT

A FSK modulator which uses the combination of a state machine and a toggle flip-flop to generate the FSK signals. The state machine has a loop having a predetermined number of states. The number of clock cycles that the state machine takes to traverse the loop depends on the state or level of the signal at the input to the modulator. The flip-flop converts the state machine output signal to a signal having a rectangular waveform.

14 Claims, 3 Drawing Sheets

DIGITAL FSK MODULATOR

FIELD OF THE INVENTION

The invention relates to frequency-shift keying (FSK) and more particularly to a digital FSK modulator.

DESCRIPTION OF THE PRIOR ART

FSK is a form of frequency modulation wherein the modulating wave shifts the output frequency between predetermined values corresponding to the frequencies of correlated sources. Digital FSK transmitters are known. One example of such a transmitter is described in U.S. Pat. No. 5,365,548 which issued to William E. Baker on Nov. 15, 1994 and is assigned to the predecessor of the assignee of this application.

Baker describes an FSK transmitter which consists of a 13 stage accumulator, a 13 stage adder and means for adding a number, N, to the accumulator at the rate determined by the frequency of the clock signal into the accumulator. In Baker the clock frequency is 3 MHz.

In Baker it is desired to generate FSK frequencies of 19 KHz and 30.5 KHz. The best that can be done, however, is to divide the 3 MHz clock signal by whole numbers which are equal to a count that is less than the full count of the accumulator. This division gives rise to a FSK frequency which is slightly below 19 KHz and a FSK frequency which is slightly above 30.5 KHz. In order to compensate therefor, Baker includes two registers whose outputs are selectively added to the accumulator depending if the input data is a zero or a one.

While the FSK modulator described in Baker works well in practice, it is desirable to have an all digital FSK modulator that is easier to design and analyze, has less circuitry and a lower clock frequency than the modulator described in Baker. The lower the clock frequency of the modulator, the less power the modulator will consume.

A modulator for generating a FSK signal that has a rectangular waveform. The modulator includes a state machine that has a loop. The loop has a predetermined total number of states. The state machine responds to one or more first signals each of which have a level which may vary between a predetermined number of levels. The first signal level determines how many of the predetermined total number of states the state machine must traverse to complete the loop. The state machine also responds to a second signal with a known frequency for producing an output signal with a frequency that is a function of the second signal known frequency and the first signal level. The modulator also includes a circuit that converts the state machine output signal to the rectangular waveform FSK signal.

A method for generating a FSK modulated signal that has a rectangular waveform. The method has the steps of:

a) traversing a loop of a state machine which has a predetermined total number of states in response to one or more first input signals to the state machine each having a level which may vary between a predetermined number of levels. The first signal level determines how many of the predetermined total number of states the state machine must traverse to complete the loop;

b) producing an output signal from the state machine with a frequency that is a function of a second input signal to the state machine having a known frequency and the first signal level; and c) converting the state machine output signal to the rectangular waveform FSK signal.

A modulator as described above in which the state machine output signal has a pulsed waveform and the converting circuit converts the pulsed waveform state machine output signal to the rectangular waveform output signal. A method as described above in which the output signal produced from the state machine has a pulsed waveform and the converting step converts the pulsed waveform state machine output signal to the rectangular waveform output signal.

DESCRIPTION OF THE PREFERRED EMBODIMENT(S)

Figure 1:
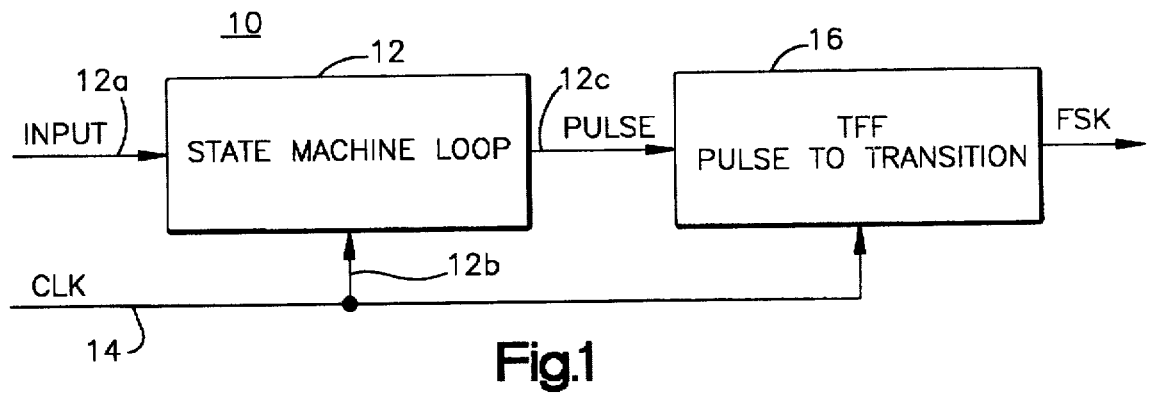
FIG. 1 shows a block diagram of a modulator embodied in accordance with the present invention.

Referring now to FIG. 1 there is shown a block diagram of a modulator 10 embodied in accordance with the present invention. Modulator 10 includes state machine 12 which receives at its input 12a a signal which is either a zero or a one. The state machine also receives at its input 12b the clock signal 14. As will be described in more detail in connection with the flow diagram of FIG. 2, the state machine 12 is a circular loop comprised of a predetermined number of states. In the embodiment described herein the state machine 12 has eight states.

The signal at input 12a determines how the state machine progresses through the states. At each clock cycle the input signal at 12a is sampled to determine the next state. The state machine provides a pulse at its output 12c each time it completes the loop. The frequency at which the pulses occur at output 12c depend on how fast the state machine completes the circular loop of states.

Modulator 10 also includes a toggle flip-flop 16 which converts the pulses at output 12c of the state machine into transitions. The output of flip-flop 16 is the FSK signal.

The frequency of the FSK signal at the output of flip-flop 16 is related to the clock signal frequency and the number of states traveled in completing each loop of state machine 12 as follows:

FSK freq.=Clock freq./(2× # of states traveled).

Figure 2:
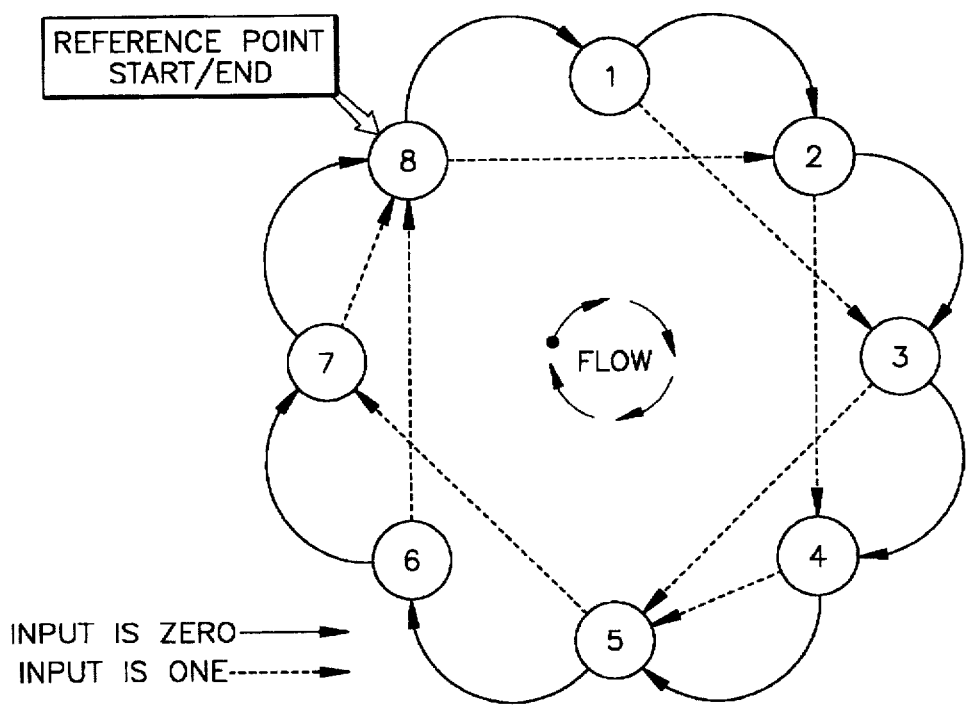
FIG. 2 shows a flow diagram of the state machine shown in FIG. 1.

Referring now to FIG. 2, there is shown a flow diagram of state machine 12 having a circular loop comprised of eight states. FIG. 2 shows eight circles which are numbered from 1 to 8 in a clockwise direction. Each circle represents a state and state 8 is a point of reference that is both the start and the end of the state machine. At each cycle of the clock signal, the state machine will move one or more states in the clockwise direction.

The number of states that state machine 12 moves in the clockwise direction for each cycle depends on the state or level of the signal at the input 12a at the occurrence of the next clock cycle. If the input is low, that is a zero, the state machine moves to the next adjacent higher state. Therefore, if the state machine is in state n and the input is low at the next clock cycle the state machine will move to state n+1. If the input is high, that is a one, the state machine as a general rule skips the next adjacent state and moves to a state that is two higher than the state it was in. Therefore, if the state machine is in state n and the input is high at the next clock cycle the state machine will, except as described below, move to state n+2.

As is described directly above, the general rule for a high input is that state machine 12 will move to a state that is two higher than the state it was in. There may be exceptions to this general rule where the next state is n+1 higher than the prior state even though the input to the state machine is high. One such exception occurs where it is desired to generate an odd number of cycles traveled in each loop for a constant high input. In the embodiment of the state machine 12 described herein, state 4 is the exception to the general rule for a high input.

Thus, state machine 12 crosses through the reference point (state 8) at a rate that depends on the level of the signal at input 12a. If the signal at input 12a is always a zero the state machine completes the loop in eight clock cycles. If the signal at input 12a is always a one the state machine completes the loop in five clock cycles. If the signal at input 12a changes from a zero to a one or vice versa during the cycling of the state machine through a loop, the state machine completes the loop in between five and eight clock cycles depending on where in the loop the input changed its level. Therefore, in the embodiment described herein the number of possible states or clock cycles in a complete loop are either 5, 6, 7 or 8.

The signal at output 12c of state machine 12 is a zero for all states of the machine except the reference state, state 8. The signal at output 12c is a one whenever the state machine is in the reference state. Therefore, a pulse will be generated at output 12c each time the state machine crosses the reference state. As can be appreciated from the description herein, the rate at which the pulses are generated at output 12c depends on how many states the machine must complete in each loop. The lower the number of such states, the more frequently the pulses appear at output 12c and vice versa.

In one specific embodiment of the invention the clock frequency was selected to be 307 KHz. With the signal at the input 12a a constant zero, the number of states traveled in completing each loop is eight and the frequency of the FSK signal, FSK freq., is using the equation described above:

FSK freq.=307 KHz/(2×8)=19.2 KHz.

Figure 3:
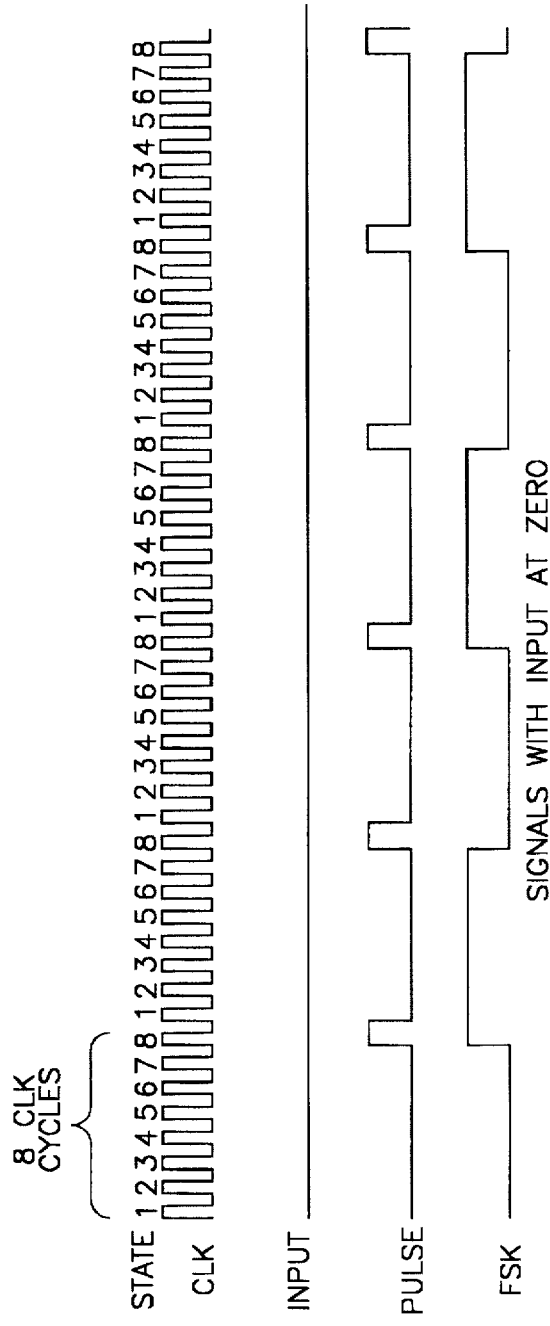
FIG. 3 shows the clock signal, the pulses at the output of the state machine and the FSK signal at the output of the modulator when the input signal level to the state machine is a constant high.

The clock signal at input 12b, the constant zero at input 12a, the pulses at output 12c and the 19.2 KHz FSK signal resulting therefrom are shown in FIG. 3.

In that same embodiment, with the signal at the input 12a a constant one, the number of states traveled in completing each loop is five and the frequency of the FSK signal, FSK freq., is using the equation described above:

FSK freq.=307 KHz/(2×5)=30.7 KHz.

Figure 4:
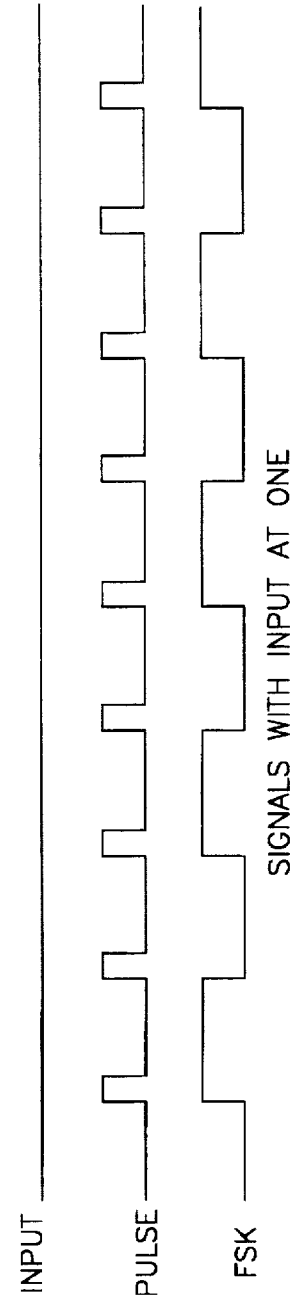
FIG. 4 shows the clock signal, the pulses at the output of the state machine and the FSK signal at the output of the modulator when the input signal level to the state machine is a constant low.

The clock signal at input 12b, the constant one at input 12a, the pulses at output 12c and the 30.7 KHz FSK signal resulting therefrom are shown in FIG. 4.

Figure 5:
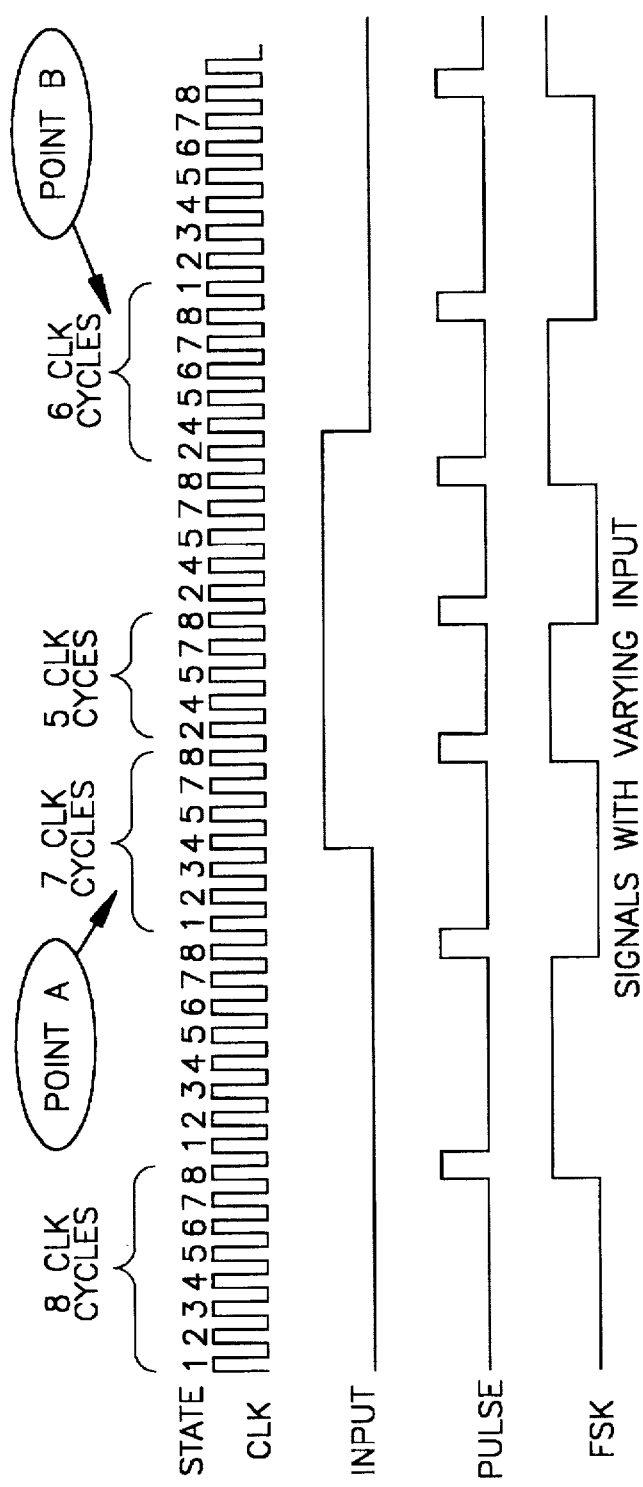
FIG. 5 shows the clock signal, the pulses at the output of the state machine and the FSK signal at the output of the modulator for a change in the input signal level to the state machine.

Referring now to FIG. 5, there is shown the clock signal, level at input 12a, the pulses at output 12c and the FSK signal resulting therefrom in response to a change in level of the signal at input 12a. Initially the input level to the state machine is a zero. Therefore, the state machine uses 8 states to completed its loop.

At a time designated in FIG. 5 as A, the level of the input changes to a one. This change in level occurs just after the state machine enters state 4. As was described above, in this embodiment state 4 is the exception to the general rule for the operation of the state machine in response to a high at input 12a. Even though the input is high at the next clock cycle the state machine does not enter state 6 but enters only state 5. Since the input level remains high, the state machine at the next subsequent clock cycle enters state 7.

The loop is completed when the state machine enters state 8 which is the end of one loop and the beginning of the next loop. Thus as is shown in FIG. 5, the state machine traverses the loop which includes the change in level from a low to a high in seven states. The state machine traverses each loop thereafter for which the input level remains high in five states.

As can be seen from FIG. 5, the input level remains high until a time B at which the level changes from a high to a low. That change in level occurs just after the state machine has entered state 4. As the input level was high prior to the change in level, it took the state machine only two states to go from state 8 to state 4. Thereafter, with the input level low the state machine must traverse four states in order to return to state 8. Thus, the state machine traverses the loop which includes the change in level from a high to a low in six states.

While only FIG. 1 shows state machine 12 with only one input signal 12a, it should be appreciated that there can be multiple input signals to the state machine. Such multiple input signals will then give rise to multiple FSK signals at the output of modulator 10.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A modulator for generating a FSK signal having a rectangular waveform comprising:
   a) a state machine having a closed loop, said closed loop having a predetermined total number of states, said state machine responsive to one or more first signals each having a level which may vary between a predetermined number of levels, said first signal level determining how many of said predetermined total number of states said state machine must traverse to complete said closed loop, and to a second signal with a known frequency for producing an output signal with a frequency that is a function of said second signal known frequency and said first signal level; and
   b) means for converting said state machine output signal to said rectangular waveform FSK signal.

2. The FSK modulator of claim 1 wherein said state machine output signal has a pulsed waveform and said converting means converts said pulsed waveform state machine output signal to said rectangular waveform FSK signal.

3. The FSK modulator of claim 1 wherein said predetermined total number of states in said state machine loop is eight.

4. The FSK modulator of claim 1 wherein said predetermined number of levels of said one or more first signals is two.

5. The FSK modulator of claim 4 wherein said state machine traverses all of said predetermined total number of states in said loop to complete said loop for one of said two levels of said one or more first signals.

6. The FSK modulator of claim 1 wherein said means for converting said state machine output signal to transitions is a toggle flip-flop.

7. A method for generating a FSK modulated signal having a rectangular waveform comprising the steps of:

a) traversing a closed loop of a state machine having a predetermined total number Of states in response to one or more first input signals to said state machine each having a level which may vary between a predetermined number of levels, said first signal level determining how many of said predetermined total number of states said state machine must traverse to complete said closed loop;

b) producing an output signal from said state machine with a frequency that is a function of a second input signal to said state machine having a known frequency and said first signal level; and c) converting said state machine output signal to said rectangular waveform FSK modulated signal.

8. The method of claim 7 wherein said output signal produced from said state machine has a pulsed waveform and said converting step converts said pulsed waveform state machine output signal to said rectangular waveform FSK signal.

9. A modulator for generating a FSK modulated signal having a rectangular waveform comprising:

a) a state machine having a loop, said loop having a predetermined total number of states, said state machine responsive to one or more first signals each having a level which may vary between a predetermined number of levels, said first signal level determining how many of said predetermined total number of states said state machine must traverse to complete said loop, and to a second signal with a known frequency for producing an output signal having a pulsed waveform and a frequency that is a function of said second signal known frequency and said first signal level; and b) means for converting said state machine pulsed waveform output signal to said rectangular waveform FSK modulated signal.

10. The modulator of claim 9 wherein said predetermined total number of states in said state machine loop is eight.

11. The modulator of claim 9 wherein said predetermined number of levels of said one or more first signals is two.

12. The FSK modulator of claim 11 wherein said state machine traverses all of said predetermined total number of states in said loop to complete said loop for one of said two levels of said one or more first signals.

13. The FSK modulator of claim 9 wherein said means for converting said state machine pulsed waveform output signal to said rectangular waveform FSK modulated signal is a toggle flip-flop.

14. A method for generating a FSK modulated signal having a rectangular waveform comprising the steps of:

a) traversing a loop of a state machine having a predetermined total number of states in response to one or more first input signals to said state machine each having a level which may vary between a predetermined number of levels, said first signal level determining how many of said predetermined total number of states said state machine must traverse to complete said loop;

b) producing an output signal having a pulsed waveform from said state machine with a frequency that is a function of a second input signal to said state machine having a known frequency and said first signal level; and c) converting said state machine pulsed waveform output signal to said rectangular waveform FSK modulated signal.

* * * * *